3,131,782
AUTOMATIC TRANSMISSION POWER
RELIEVING SAFETY DEVICE
Wilbern M. Freeman, North Miami Beach, Fla.
(3501 NW. 7th Ave., Miami 27, Fla.)
Filed May 23, 1962, Ser. No. 197,081
5 Claims. (Cl. 180—82)

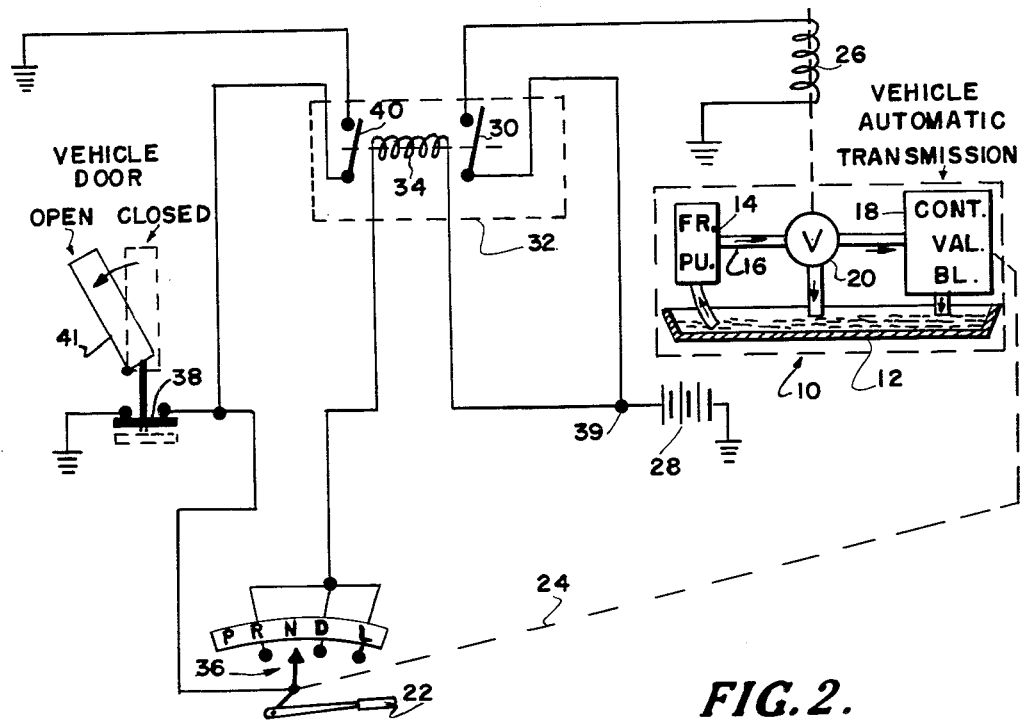
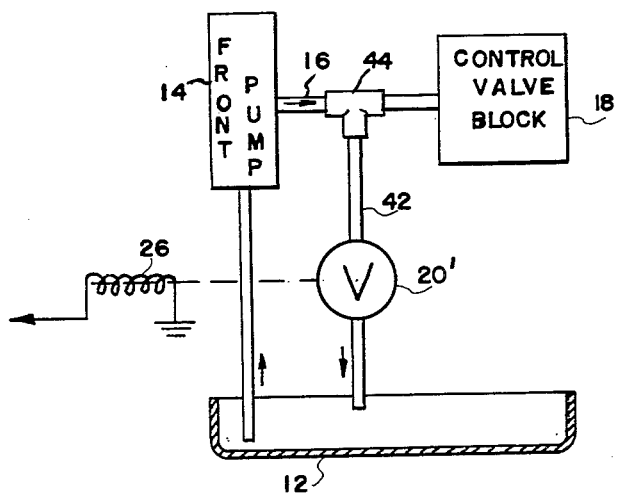

This invention relates to improvements in safety devices relating to vehicles, and especially to motor road vehicles provided with automatic transmissions.

Notwithstanding laws to the contrary, many automobile drivers leave the engine running and in gear when leaving their cars, thereby endangering lives and property. This is particularly true in the case of automobiles with "automatic transmissions" which do not have a clutch pedal connected therewith.

Prior art safety devices used with automatic transmissions have been rather complicated from either electrical or mechanical standpoints, or both, and it is therefore a primary object of this invention to provide a simplified and improved safety device usable with vehicles equipped with automatic transmissions.

In a specific embodiment, the invention contemplates by-passing the operating fluid in a hydraulic automatic transmission by use of a solenoid operated valve when the transmission is in any vehicle operating condition, such as "drive," and at least one of the doors of the vehicle is open, to put the transmission into a vehicle non-operating condition.

Other objects and details of various embodiments of the invention will become more apparent upon reading the following detailed description and appended claims is conjunction with the drawing, in which:

FIGURE 1 is a schematic illustration showing the circuitry operating a valve in the automatic transmission, and FIGURE 2 is a modification of the valve connection in the transmission of FIGURE 1.

It is to be understood that this invention contemplates any type ground vehicle having any type of automatic transmission which itself has operating power within to effect operation of its different parts. This of course includes electric tranmissions in which the electricity is the operating power, as well as fluid transmission such as those of the hydraulic type. The description proceeds relative to a hydraulic transmission, but limitation thereto is not intended.

The automatic transmission 10 in FIGURE 1 includes sump 12 from which hydraulic fluid is drawn by a pump 14, such as the regular front pump of an automatic transmission. Fluid is thereby forced via a main conveying line 16 to other parts of the transmission 18 generally designated a control valve block. In accordance with one embodiment of this invention, the fluid in line 16 is by-passed back into sump 12 by a valve 20 under certain conditions when the transmission should not be in a vehicle operating condition. Such times are when the engine of the vehicle is running and a door of the vehicle is open.

In normal manner, transmission 10 may be changed from a vehicle non-operating condition such as neutral N or park P, to a vehicle operating condition such as the drive D, low L or reverse R conditions, by a manual selector lever 22, as is indicated by the dash line 24 extending between lever 22 and the control valve block 18 of the transmission.

From the electrical standpoint, the invention contemplates controlling valve 20 by a solenoid 26 when current from battery 28 is delivered thereto via the relay contact set or switch 30 of relay 32. As is apparent, battery 28, relay coil 34, selector switch 36, and each normally closed, pushbutton type door switch 38 (of which there may be a respective one for each door or just one for the driver's door, as desired) are serially connected together. A main battery on-off switch (not shown) may be such as the usual ignition switch, between the battery and junction 39. Relay 32 has a second contact set or switch 40 which parallels each door switch 38.

In operation, assuming the vehicle engine is running if selector lever 22 is in either of the vehicle non-operating conditions N or P, switch 36 is in an open circuit condition, and relay coil 34 is then not energized. However, if selector arm 22 is moved to any of the vehicle operating positions R, D or L, switch 36 is then in a circuit closing condition so that relay coil 34 will be energized whenever door switch 38 is also in a closed circuit condition, which occurs when vehicle door 41 opens, for example to the full line position illustrated. Switch 38 may be the regular ground switch on the vehicle door that is used to turn on courtesy lights when the door opens, or may be another switch similarly disposed to effect completion of a circuit when the door opens.

As soon as the door opens while the selector switch 36 is in a closed circuit condition, relay 32 is thereby actuated so as to cause closures of its contact sets or switches 30 and 40. Closure of switch 30 cause energization of solenoid 26 which in turn causes valve 20 to relieve the pressure of the operating fluid on control valve block 18. In particular, valve 20 causes the fluid to by-pass the control valve block by returning it from line 16 directly into sump 12. In this manner, the operating power, i.e., the pressurized hydraulic fluid, no longer can operate the control valve block to effect any vehicle operating condition, but in effect changes it to a vehicle non-operating condition.

The transmission is caused to remain in a non-operating condition thereafter even if door switch 38 re-opens due to door 41 being closed again, since that switch is paralleled by relay switch 40, and this latter switch stays closed until selector arm 22 is moved to either of the neutral or park positions to cause switch 36 to return to an open circuit condition.

As a modification, the transmission diagrammed in FIGURE 2 has a solenoid operated valve 20′ returning pressurized fluid from line 16 to sump 12 via a line 42 connected into line 16 by a T 44 or the like. This relieves the pressure and fluid from control valve block 18 notwithstanding the continued pumping by pump 14. This type of an installation is such as might be readily made an attachment to a used car. That is, the main oil line 16 for example may be readily tapped and brought outside the transmission for convenient insertion of the solenoid operated valve, with the return from the valve being readily disposed back into pan 12. On the other hand, the arrangement shown in FIGURE 1 is the type that may be more readily installed initially during the manufacture of a new car, than in used cars.

It will be appreciated that valve 20 may be utilized at any one of a large number of different points in the transmission to relieve hydraulic pressure and return the operating fluid into the pan. It may be an external relief valve, or it may be incorporated in the valve body assembly of the transmission, or inserted in one of the oil channels, to name but a few of the points where the valve may be conveniently utilized. In any event, it is the purpose of the valve to relieve operating power within the automatic transmission, when it is caused to do so by energization of solenoid 26, to cause the transmission to change to a vehicle non-operating condition due to the lack of operating power or fluid available to effect a vehicle operating condition.

Thus, there has been disclosed apparatus which fully performs the objects and advantages heretofore indicated.

What is claimed is:

1. A safety device for a vehicle equipped with at least one door and with a transmission having vehicle operating and vehicle non-operating conditions the former of which is effected by operating power within said transmission, comprising first and second switch means for operation to respective closed circuit conditions respectively when said door is at least partially open and when said transmission is in a said operating condition, means automatically operative, when both of said first and second switch means are in their said closed circuit condition for effectively changing the transmission to a said vehicle non-operating condition, and means coupled to said first and second switch means for causing said transmission to remain relieved until said second switch means is caused to be in an open circuit condition even if said first switch means has its said closed circuit condition opened earlier.

2. A safety device for a vehicle equipped with at least one door and with automatic transmission having vehicle operating and vehicle non-operating conditions selectable by a selector, comprising first switch means for operation by said door to an open circuit condition when the door is closed and to a closed circuit condition when the door is at least partially open, second switch means for operation by said selector to a closed circuit condition when the said automatic transmission is in an operating condition and to an open circuit condition when the said automatic transmission is in a non-operating condition, and means independent of said selector operative, when said first and second switch means are each in their said closed circuit condition, on the power within said automatic transmission which operates same for relieving that operating power to change said transmission to a vehicle non-operating condition, and further including automatic holding means coupled to said first and second switch means for causing said operating power in the automatic transmission to remain relieved until said second switch means is caused by said selector to be in an open circuit condition notwithstanding any earlier opening of the said closed circuit condition of said first switch means by the closing of said door.

3. In combination, a vehicle having at least one door and a hydraulic automatic transmission including a sump, a control valve block, a pump and a line for pumping and conveying within said transmission operating power in the form of hydraulic fluid under a given operating pressure from said sump to said control valve block through said pump, said transmission having vehicle operating and non-operating conditions selectable by a selector with the former being effected by the said fluid operating power within said transmission, first and second switch means respectively operable by said door and selector to closed circuit conditions when said door is at least partially open and when said transmission is in a said operating condition, and means independent of said selector and operative, when both said first and second switch means are in their said closed circuit conditions, on the said fluid operating power within said transmission and including a solenoid operated valve coupled to said line at a point effectively between said pump and control block for relieving that power by relieving fluid in said line following the said solenoid valve to effect a by-pass of said control block and return said fluid to said sump while preventing the fluid in the said line between said pump and valve from ever increasing in pressure above said given operating pressure for effecting a change in the transmission to a vehicle non-operating condition without subjecting the pump and said by-pass to fluid pressures higher than said operating pressure.

4. In combination, a vehicle having at least one door and a hydraulic automatic transmission having a line for carrying pressurized fluid as the transmission operating power, said transmission having vehicle operating and non-operating conditions selectable by a selector with the former being effected by said fluid operating power within the said transmission, first and second serially connected switch means respectively operable by said door and selector to closed circuit conditions when said door is at least partially open and when said transmission is in a said operating condition, a battery and means independent of said selector and operative, when both said first and second switch means are in their said closed circuit conditions, on the said fluid operating power within said automatic transmission and including a solenoid operated valve coupled to said line for relieving that power by relieving fluid pressure in said line following said valve for changing the transmission to a said vehicle non-operating condition, said power relieving means further comprising means for operating said valve including a relay having a coil serially connected with the said switch means and having two switches the first of which is connected between the solenoid of said valve and said battery for energizing said solenoid when said relay coil is energized and the second of which is closed when the relay coil is energized and is connected in parallel with the said first switch means for holding said relay coil energized even if said door closes.

5. In combination, a vehicle having at least one door and an automatic transmission having vehicle operating and vehicle non-operating conditions selectable by a selector with the former being effected by operating power within the said transmission, first and second switch means respectively operable by said door and selector to closed circuit conditions when said door is at least partially open and when said transmission is in a said operating condition, and means independent of said selector operative, when both said first and second switch means are in their said closed circuit condition, on the said operating power within said automatic transmission for relieving that power and changing the transmission to a vehicle non-operating condition, wherein said power relieving means includes an electrical relay having a coil connected in series with said first and second switch means so as to be energized when both switch means are in their said closed circuit conditions, said relay having a normally open contact for controlling the said transmission operating power, said relay having a second normally open contact, which is coupled in parallel with said door operated first switch means, for causing said operating power to remain relieved until said second switch means is caused by said selector to be in an open circuit condition notwithstanding any earlier opening of the said closed circuit condition of said first switch means by the closing of said door.

References Cited in the file of this patent

UNITED STATES PATENTS

| | | |
|---|---|---|
| 2,740,947 | Davies | Apr. 3, 1956 |
| 2,882,986 | Cash | Apr. 21, 1959 |
| 2,904,146 | Codlin | Sept. 15, 1959 |
| 2,923,175 | Perkins | Feb. 2, 1960 |
| 2,990,925 | Bernotas | July 4, 1961 |